United States Patent
Bin et al.

(10) Patent No.: US 11,784,590 B2
(45) Date of Patent: Oct. 10, 2023

(54) MOTOR DRIVING APPARATUS AND METHOD OF CONTROLLING SAME

(71) Applicants: Hyundai Motor Company, Seoul (KR); Kia Corporation, Seoul (KR)

(72) Inventors: Seung Hyeon Bin, Gyeonggi-Do (KR); Han Hee Park, Gyeonggi-Do (KR); Seong Min Kim, Gyeongsangnam-Do (KR); Ho Rim Choi, Gyeonggi-Do (KR); Seon Mi Lee, Gyeonggi-Do (KR); Sang Woo Park, Gyeonggi-Do (KR); Tae Il Yoo, Gyeonggi-Do (KR); Ho Sun Jang, Chungcheongnam-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1 day.

(21) Appl. No.: 17/697,607

(22) Filed: Mar. 17, 2022

(65) Prior Publication Data
US 2022/0393622 A1    Dec. 8, 2022

(30) Foreign Application Priority Data
Jun. 4, 2021    (KR) .......................... 10-2021-0072994

(51) Int. Cl.
*H02P 5/74* (2006.01)
*H02P 27/08* (2006.01)
(Continued)

(52) U.S. Cl.
CPC ................. *H02P 5/74* (2013.01); *H02K 3/28* (2013.01); *H02K 11/33* (2016.01); *H02P 27/08* (2013.01)

(58) Field of Classification Search
CPC .......... H02P 5/74; H02P 27/08; H02K 11/33; H02K 3/28
See application file for complete search history.

(56) References Cited

U.S. PATENT DOCUMENTS

2009/0033253 A1    2/2009  Nagashima et al.
2019/0252994 A1*   8/2019  Kobayashi ............. H02M 11/00
(Continued)

FOREIGN PATENT DOCUMENTS

JP    6285256           2/2018
KR    10-2021-0122343   10/2021
KR    10-2023-0108610   7/2023

*Primary Examiner* — Zoheb S Imtiaz
(74) *Attorney, Agent, or Firm* — MORGAN, LEWIS & BOCKIUS LLP (57) ABSTRACT

An automotive motor driving apparatus includes: a first motor including a plurality of wires; and a second motor including a plurality of wires including first ends connected to each other. The motor driving apparatus includes: a first inverter connected to first ends of the wires of the motor and including a plurality of first switching devices; a second inverter connected to second ends of the wires of the first motor and including a plurality of second switching devices; a third inverter connected to second ends of the wires of the second motor; and a controller configured to drive the second motor by performing pulse width control on the third switching devices when a problem occurs in the second inverter while driving the first motor in an open end winding mode in which pulse width modulation control is performed on both of the first switching devices and the second switching devices.

19 Claims, 6 Drawing Sheets

(51) Int. Cl.
*H02K 11/33* (2016.01)
*H02K 3/28* (2006.01)

(56) References Cited

U.S. PATENT DOCUMENTS

2019/0288628 A1* 9/2019 Kobayashi ............ H02M 3/158
2019/0393823 A1* 12/2019 Ghaderi ................. H02P 25/22
2020/0373867 A1* 11/2020 Yamashita ........... B62D 5/0403

* cited by examiner

MOTOR DRIVING APPARATUS AND METHOD OF CONTROLLING SAME

CROSS REFERENCE TO RELATED APPLICATION

The present application claims priority to Korean Patent Application No. 10-2021-0072994, filed Jun. 4, 2021, the entire contents of which is incorporated herein for all purposes by this reference.

BACKGROUND OF THE PRESENT DISCLOSURE

Field of the Present Disclosure

The present disclosure relates to a motor driving apparatus and a method for controlling the same. The present disclosure relates to a motor driving apparatus that can compensate for reduction of output of a driving wheel due to malfunction of an inverter by controlling another driving wheel when an inverter for open end winding control in a vehicle in which a motor, which is driven in an open end winding type, is connected to one of driving wheels and a motor, which is driven in a Y-connection type, is connected to another driving wheel, and a method for controlling the motor driving apparatus.

Description of Related Art

In general, coils each having a phase included in a motor are connected to one inverter at an end and connected to each other at the other end, forming Y-connection.

When the motor is driven, a switching device in the inverter applies a line voltage to the Y-connected coils of the motor and generates an AC current while being turned on/off by pulse width modulation control, generating torque.

Because the fuel efficiency (energy efficiency) of eco-friendly vehicles such as an electric vehicle that use torque generated by a motor as power depends on the power conversion efficiency of inverter-motor, it is important to maximize the power conversion efficiency of an inverter and the efficiency of a motor to improve fuel efficiency.

The efficiency of an inverter-motor system generally depends on voltage utilization of an inverter, and the fuel efficiency of a vehicle may be improved when the operating point of a vehicle which depends on the relationship between the speed and the torque of a motor appears in a period with high voltage utilization.

However, the larger the number of coils in a motor to increase the maximum torque of the motor, the more the period with high voltage utilization moves away from a low-torque region which is the main operation point of a vehicle, so that the fuel efficiency may decrease. Furthermore, when a main operation point is designed to be included in a period with high voltage utilization in consideration of fuel efficiency, the acceleration performance of a vehicle decreases due to a limit in the maximum torque of a motor.

To solve the present problem, a method of driving a motor in an open end winding (OEW) type of connecting an inverter to each of both ends of coils of a motor and driving the two inverters instead of generating a short circuit at ends of a coil through Y-connection in a motor has been provided in the art.

The method of driving a motor in an open end winding type has the advantage, in comparison to a common method of driving a motor having a Y-connection structure, that the phase voltage is increased, so voltage utilization may be improved and high output is possible.

In four-wheel driving electric vehicles, the output of the driving wheels of the front wheels and rear wheels is improved by a motor which is driven in the open end winding type and assistant output is generated by a motor having a Y-connection structure for the assistant driving wheels, whereby it is possible to improve the driving efficiency of the electric vehicles.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving apparatus that can secure stable output of a vehicle when one of inverters connected to a motor in an open end winding type breaks in a vehicle including one driving wheel that generates power using a motor, which is driven in an open end winding type, and another driving wheel that generates power using a motor, which is driven in a Y-connection type, and a method of controlling the motor driving apparatus.

To solve the problems, various aspects of the present disclosure are directed to providing a motor driving apparatus including a first motor providing power to a first driving wheel of a vehicle and including a plurality of coils corresponding to a plurality of phases, respectively, and a second motor providing power to a second driving wheel of the vehicle and including a plurality of coils corresponding to a plurality of phases, respectively, and including first ends connected to each other. The motor driving apparatus includes: a first inverter connected to first ends of the coils of the first motor and including a plurality of first switching devices; a second inverter connected to second ends of the coils of the first motor and including a plurality of second switching devices; a third inverter connected to second ends of the coils of the second motor; and a controller configured to drive the second motor by performing pulse width control on the third switching devices when a problem occurs in the second inverter while driving the first motor in an open end winding mode in which pulse width modulation control is performed on the first switching devices and the second switching devices.

In an exemplary embodiment of the present disclosure, when the problem occurs in the second inverter in the open end winding mode, the controller may connect the second ends of the coils of the first motor to each other and may drive the first motor in a Y-connection mode in which pulse width modulation control is performed on the first switching devices.

In an exemplary embodiment of the present disclosure, the motor driving apparatus may further include a plurality of switches of which first ends are connected to the second ends of the coils of the first motor, respectively, and of which second ends are connected to each other, in which when the problem occurs in the second inverter in the open end winding mode, the controller may turn on the switches and drive the first motor in the Y-connection mode.

In an exemplary embodiment of the present disclosure, when a problem occurs in the second inverter while the controller drives the first motor in the open end winding mode, the controller may divide and determine preset entire required torque into a torque command of the first motor and a torque command of the second motor.

In an exemplary embodiment of the present disclosure, when a problem occurs in the second inverter while the controller drives the first motor in the open end winding mode, the controller may distribute and determines preset entire required torque into a torque command of the first motor and a torque command of the second motor in accordance with a preset distribution ratio.

In an exemplary embodiment of the present disclosure, the controller may include a torque limit table keeping a first torque limit value which is applied to the first motor in the open end winding mode, a second torque limit value which is applied to the first motor in the Y-connection mode, and a third torque limit value which is applied to the second motor when the second motor is driven by performing pulse width modulation control on the third switching device.

In an exemplary embodiment of the present disclosure, when a problem occurs in the second inverter while the controller drives the first motor in the open end winding mode, the controller may be configured to control the first motor to output the second torque limit value and may control the second motor to output the third torque limit value when the torque command of the second motor divided and determined from the preset entire required torque is smaller than or a same as the third torque limit value and the torque command of the first motor divided and determined from the preset entire required torque is smaller than or a same as the second torque limit value.

In an exemplary embodiment of the present disclosure, when a problem occurs in the second inverter while the controller drives the first motor in the open end winding mode, the controller may change the torque command of the second motor into the third torque limit value and may determine the torque command of the first motor as a value obtained by subtracting the third torque limit value from the preset entire required torque when the torque command of the second motor divided and determined from the preset entire required torque is greater than the third torque limit value.

In an exemplary embodiment of the present disclosure, when the torque command of the first motor determined as the value obtained by subtracting the third torque limit value from the preset entire required torque is smaller than or a same as the second torque limit value, the controller may be configured to control the first motor to output the value obtained by subtracting the third torque limit value from the preset entire required torque; and when the torque command of the first motor determined as the value obtained by subtracting the third torque limit value from the preset entire required torque is greater than the second torque limit value, the controller may be configured to control the first motor to output the second torque limit value.

In an exemplary embodiment of the present disclosure, when a problem occurs in the second inverter when the controller drives the first motor in the open end winding mode, the controller may change the torque command of the first motor into the second torque limit value and may determine the torque command of the second motor as the value obtained by subtracting the second torque limit value from the preset entire required torque when the torque command of the second motor divided and determined from the preset entire required torque is smaller than or a same as the third torque limit value and the torque command of the first motor divided and determined from the preset entire required torque is greater than the second torque limit value.

In an exemplary embodiment of the present disclosure, when the torque command of the second motor determined as the value obtained by subtracting the second torque limit value from the preset entire required torque is smaller than or a same as the third torque limit value, the controller may be configured to control the second motor to output the value obtained by subtracting the second torque limit value from the preset entire required torque; and when the torque command of the second motor determined as the value obtained by subtracting the second torque limit value from the preset entire required torque is greater than the third torque limit value, the controller may be configured to control the second motor to output the third torque limit value.

To solve the problems, another aspect of the present disclosure provides a method of driving a motor which controls the motor driving apparatus described above. The method includes: recognizing that a problem has occurred in the second inverter while driving the first motor in an open end winding mode in which pulse width modulation control is performed on both of the first switching devices and the second switch devices by the controller; dividing and determining preset entire required torque into a torque command of the first motor and a torque command of the second motor by the controller; and correcting the torque command of the first motor and the second motor divided and determined from the preset entire required torque in accordance with a result of comparing the torque commands with a plurality of preset torque limit values, and driving the first motor and the second motor according to the corrected values.

In an exemplary embodiment of the present disclosure, the driving may connect the second ends of the coils of the first motor to each other and may drive the first motor in a Y-connection mode in which pulse width modulation control is performed on the first switching devices.

In an exemplary embodiment of the present disclosure, the motor driving apparatus may further include a plurality of switches of which first ends are connected to the second ends of the coils of the first motor, respectively, and of which second ends are connected to each other, and the driving may turn on the switches and may drive the first motor in the Y-connection mode by the controller when a problem occurs in the second inverter in the open end winding mode.

In an exemplary embodiment of the present disclosure, the determining may distribute and determine the preset entire required torque into a torque command of the first motor and a torque command of the second motor in accordance with a preset distribution ratio.

In an exemplary embodiment of the present disclosure, the controller may include a torque limit table keeping a first torque limit value which is applied to the first motor in the open end winding mode, a second torque limit value which is applied to the first motor in the Y-connection mode, and a third torque limit value which is applied to the second motor when the second motor is driven by performing pulse width modulation control on the third switching device.

In an exemplary embodiment of the present disclosure, the driving may control the first motor to output the second torque limit value and may control the second motor to output the third torque limit value when the torque command of the second motor divided and determined from the preset entire required torque is smaller than or a same as the third torque limit value and the torque command of the first motor divided and determined from the preset entire required torque is smaller than or a same as the second torque limit value.

In an exemplary embodiment of the present disclosure, the driving may change the torque command of the second motor into the third torque limit value and may determine the torque command of the first motor as a value obtained by subtracting the third torque limit value from the preset entire required torque by the controller when the torque command of the second motor divided and determined from the preset entire required torque is greater than the third torque limit value.

In an exemplary embodiment of the present disclosure, when the torque command of the first motor determined as the value obtained by subtracting the third torque limit value from the preset entire required torque is smaller than or a same as the second torque limit value, the driving may control the first motor to output the value obtained by subtracting the third torque limit value from the preset entire required torque by the controller; and when the torque command of the first motor determined as the value obtained by subtracting the third torque limit value from the preset entire required torque is greater than the second torque limit value, the driving may control the first motor to output the second torque limit value by the controller.

In an exemplary embodiment of the present disclosure, the driving may change the torque command of the first motor into the second torque limit value and may determine the torque command of the second motor as the value obtained by subtracting the second torque limit value from the preset entire required torque by the controller when the torque command of the second motor divided and determined from the preset entire required torque is smaller than or a same as the third torque limit value and the torque command of the first motor divided and determined from the preset entire required torque is greater than the second torque limit value.

In an exemplary embodiment of the present disclosure, when the torque command of the second motor determined as the value obtained by subtracting the second torque limit value from the preset entire required torque is smaller than or a same as the third torque limit value, the driving may control the second motor to output the value obtained by subtracting the second torque limit value from the preset entire required torque by the controller; and when the torque command of the second motor determined as the value obtained by subtracting the second torque limit value from the preset entire required torque is greater than the third torque limit value, the driving may control the second motor to output the third torque limit value by the controller.

According to the motor driving apparatus and the method for driving the apparatus, when an open end winding driving type of controlling two inverters connected to both ends of a motor coil, respectively, is applied to one of motors connected to provide a driving force to a plurality of driving wheels, even when one of the two inverters breaks and the output of the corresponding motor decreases, it is possible to compensate for the reduction of output due to the malfunction of the inverter by additionally driving a motor applied to other driving wheels. Accordingly, a driver can keep stably drive while accelerating the vehicle to a desired speed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereafter, a motor driving apparatus and a method for controlling the motor driving apparatus according to various embodiments of the present disclosure are described in detail with reference to the accompanying drawings.

Figure 1:
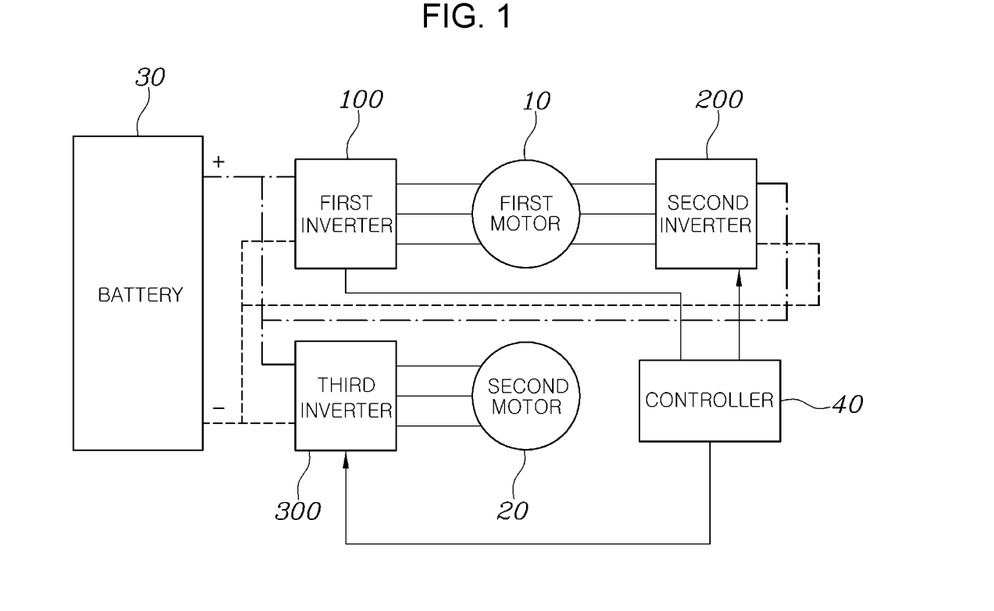
FIG. 1 is a block diagram showing the configuration of a motor driving apparatus according to an exemplary embodiment of the present disclosure.
Figure 2:
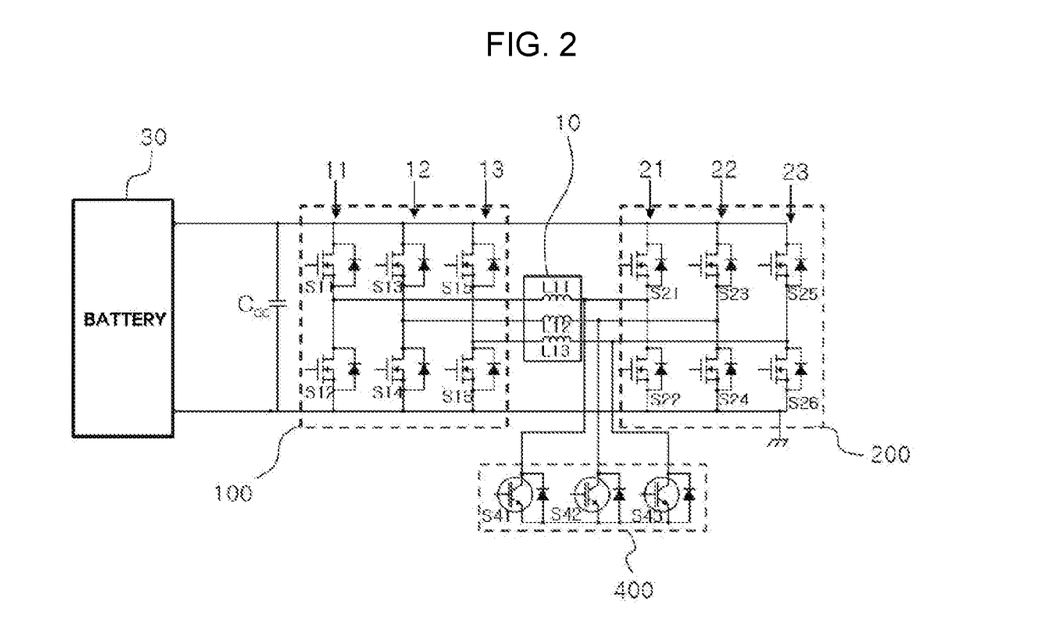
FIG. 2 is a circuit diagram showing a region in which a motor is driven in an open end winding type in the motor driving apparatus according to an exemplary embodiment of the present disclosure.
Figure 3:
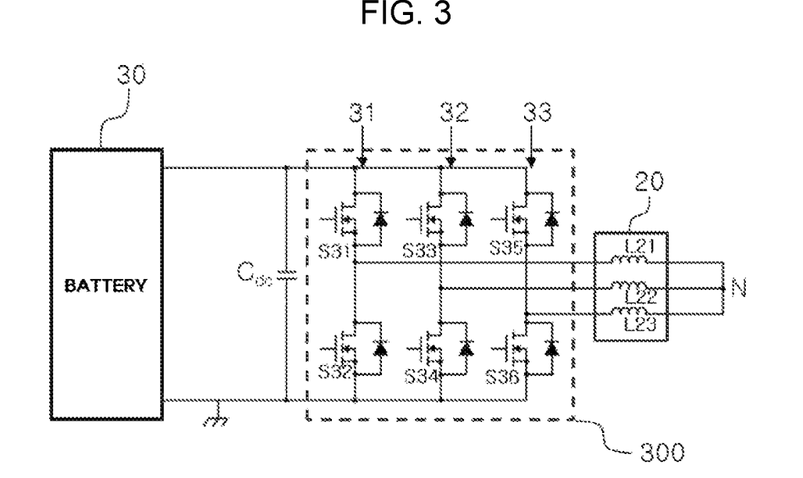
FIG. 3 is a circuit diagram showing a region in which a motor is driven in a Y-connection type in the motor driving apparatus according to an exemplary embodiment of the present disclosure.

FIG. 1 is a block diagram showing the configuration of a motor driving apparatus according to an exemplary embodiment of the present disclosure, FIG. 2 is a circuit diagram showing a region in which a motor is driven in an open end winding type in the motor driving apparatus according to an exemplary embodiment of the present disclosure, and FIG. 3 is a circuit diagram showing a region in which a motor is driven in a Y-connection type in the motor driving apparatus according to an exemplary embodiment of the present disclosure.

Referring to FIG. 1, FIG. 2, and FIG. 3, a motor driving apparatus according to an exemplary embodiment of the present disclosure is an apparatus of driving a first motor 10 providing power to one driving wheel of a vehicle and a second motor 20 for providing power to another driving wheel of the vehicle.

Both ends of a plurality of coils included in the first motor 10 are connected to a first inverter 100 and a second inverter 200, respectively, so that the first motor 10 may be driven in an open end winding type. Certain ends of a plurality of coils included in the second motor 20 are connected to each other, forming a Y-connection structure, and other ends may be connected to a third converter 300.

The first inverter to third inverter 100~300 are all connected to a battery 30, receiving a DC voltage provided from the battery 30. Furthermore, switching devices in the first to third inverters are turned on/off in a pulse width modulation type, so a phase voltage for driving the first motor 10 and the second motor 20 may be generated.

In detail, the first motor 10 and the second motor 20 are connected to the driving wheels of the vehicle, respectively, whereby they can provide power to the connected driving wheels. For example, the first motor 10 may be connected to the rear wheels of a vehicle and the second motor 20 may be connected to the front wheels of the vehicle. The opposite connection structure may be considered in another exemplary embodiment of the present disclosure.

The first motor 10 connected to the first inverter 10 and the second inverter 20 in an open end winding structure may be controlled to generate power greater than that of the second motor 20 connected to one converter, that is, the third converter 300. Accordingly, the first motor 10 may be usually connected to driving wheels for generating main driving force of a vehicle and the second motor 20 may be connected to driving wheels for generating assistant driving force of the vehicle.

First, as shown in FIG. 2, as for the connection relationship of the open end winding structure of the first motor 10, the first inverter 100, and the second inverter 200, the first motor 10 may have a plurality of coils L11~L13 corresponding to a plurality of phases. Furthermore, the first inverter 100 includes a plurality of switching devices S11~S16 and may be connected to first ends of the coils L11~L13 of the first motor 10, and the second inverter 200 includes second switching devices S21~S26 and may be connected to second ends of the coils L11~L13 of the first motor 10.

The first inverter 100 and the second inverter 200 can convert the DC power stored in the battery 300 into 3-phase AC power and provide the 3-phase AC power to the first motor 10 or can convert regenerative braking energy, which is generated by regenerative braking torque which is generated by the first motor 10 in regenerative braking, into DC power and provide the DC power to the battery 30. Such conversion between DC power and AC power may be achieved by controlling the switching states of the first switching devices S11~S16 and the second switching devices S21~S26 included in the first inverter 100 and the second inverter 200, respectively, in a pulse width modulation type.

The first converter 100 may include a plurality of legs 11~13 to which DC voltage generated at a DC link capacitor $C_{dc}$ connected between both ends of the battery 30 is applied. The legs 11~13 correspond to a plurality of phases of the first motor 10, respectively, whereby electrical connection may be formed.

In detail, the first leg 11 includes two switching devices S11 and S12 connected in series to each other between both ends of the DC capacitor $C_{dc}$ and the connection node of the two switching devices S11 and S12 may be connected to a first end of a coil L11 of one phase in the first motor 10 so that AC power corresponding to one phase of a plurality of phases is input and output.

Similarly, the second leg 12 include two switching devices S13 and S14 connected in series to each other between both ends of the DC capacitor $C_{dc}$ and the connection node of the two switching devices S13 and S14 may be connected to a first end of a coil L12 of one phase in the first motor 10 so that AC power corresponding to one phase of a plurality of phases is input and output.

The third leg 13 includes two switching devices S15 and S16 connected in series to each other between both ends of the DC capacitor $C_{dc}$ and the connection node of the two switching devices S15 and S16 may be connected to a first end of a coil L13 of one phase in the first motor 10 so that AC power corresponding to one phase of a plurality of phases is input and output.

The second inverter 200 may also have configuration similar to that of the first converter. The second converter 200 may include a plurality of legs 21~23 to which DC voltage generated at the DC link capacitor $C_{dc}$ connected between both ends of the battery 30 is applied. The legs 21~23 correspond to a plurality of phases of the first motor 10, whereby electrical connection may be formed.

In detail, the second leg 21 includes two switching devices S21 and S22 connected in series to each other between both ends of the DC capacitor $C_{dc}$ and the connection node of the two switching devices S21 and S22 may be connected to a second end of the coil L11 of one phase in the first motor 10 so that AC power corresponding to one phase of a plurality of phases is input and output.

Similarly, the second leg 22 includes two switching devices S23 and S24 connected in series to each other between both ends of the DC capacitor $C_{dc}$ and the connection node of the two switching devices S23 and S24 may be connected to a second end of the coil L12 of one phase in the first motor 10 so that AC power corresponding to one phase of a plurality of phases is input and output.

The third leg 23 includes two switching devices S25 and S26 connected in series to each other between both ends of the DC capacitor $C_{dc}$ and the connection node of the two switching devices S25 and S26 may be connected to a second end of the coil L13 of one phase in the first motor 10 so that AC power corresponding to one phase of a plurality of phases is input and output.

The first inverter 100 is connected to the first ends of the coils L11~L13 of the first motor 10 and the second inverter 200 is connected to the second ends of the coils L11 L13 of the first motor 10. That is, electrical connection of an open end winding structure in which both ends of the coils L11~L13 of the first motor 10 are connected to the first inverter 100 and the second inverter 200, respectively, may be formed.

Next, as for the connection relationship of the second motor 20 and the third inverter, the second motor 20 may have a plurality of coils L21~L23 corresponding to a plurality of phases, the third inverter 300 may include a plurality of third switching devices S31~S36 and may be connected to first ends of the coils L21~L23 of the second motor 20, and the second ends of the coils L21~L23 of the second motor 20 may be connected to each other, whereby a neutral point N may be formed.

The third converter 300 may include a plurality of legs 31~33 to which DC voltage generated at the DC link capacitor $C_{dc}$ connected between both ends of the battery 30 is applied. The legs 31~33 correspond to a plurality of phases of the first motor 20, respectively, whereby electrical connection may be formed.

In detail, the first leg 31 includes two switching devices S31 and S32 connected in series to each other between both ends of the DC capacitor $C_{dc}$ and the connection node of the two switching devices S31 and S32 may be connected to a first end of a coil L21 of one phase in the second motor 20 so that AC power corresponding to one phase of a plurality of phases is input and output.

Similarly, the second leg 32 includes two switching devices S33 and S34 connected in series to each other between both ends of the DC capacitor $C_{dc}$ and the connection node of the two switching devices S33 and S34 may be connected to a first end of a coil L22 of one phase in the second motor 20 so that AC power corresponding to one phase of a plurality of phases is input and output.

The third leg 33 includes two switching devices S35 and S36 connected in series to each other between both ends of the DC capacitor $C_{dc}$ and the connection node of the two switching devices S35 and S36 may be connected to a first end of a coil L23 of one phase in the second motor 20 so that AC power corresponding to one phase of a plurality of phases is input and output.

Referring to FIG. 2 again, the motor driving apparatus according to an exemplary embodiment of the present disclosure may further include a switch unit 400 including a plurality of switches S41~S43 that are connected to the second ends of the coils L11 L13 of the first motor 10, respectively, and can selectively connect the second ends of the coils.

First ends of the switches S41~S44 may be connected to the second ends of the coils L11~L13 in the first motor 10 and second ends of the switches S41~S43 may be connected to each other.

By the present connection structure, when the switches S41~S43 are turned off (are in open), the first inverter 100 and the second inverter 200 are respectively connected to both ends of the coils L11~L13 of the first motor and operated. When the switches S41~S43 are turned on (in a short state), first ends of the first motor 10 are connected to each other, forming a neutral point. That is, when the switches S41~S43 are turned on, the first motor 10 is operated by control of the first inverter substantially in the same way as that the second motor 20 is driven by control of the third inverter 300.

The motor driving apparatus according to an exemplary embodiment of the present disclosure, as described above, further include a controller 40 that switches the switching devices in the first to third inverters 100~300 in a PWM type.

The controller 40 is a component that switches the switching devices included in the first to third inverters 100~300 in a pulse width modulation technique based on required torque which is required to a vehicle by a driver so that the required torque may be output by the first motor 10 and the second motor 20.

Figure 4:
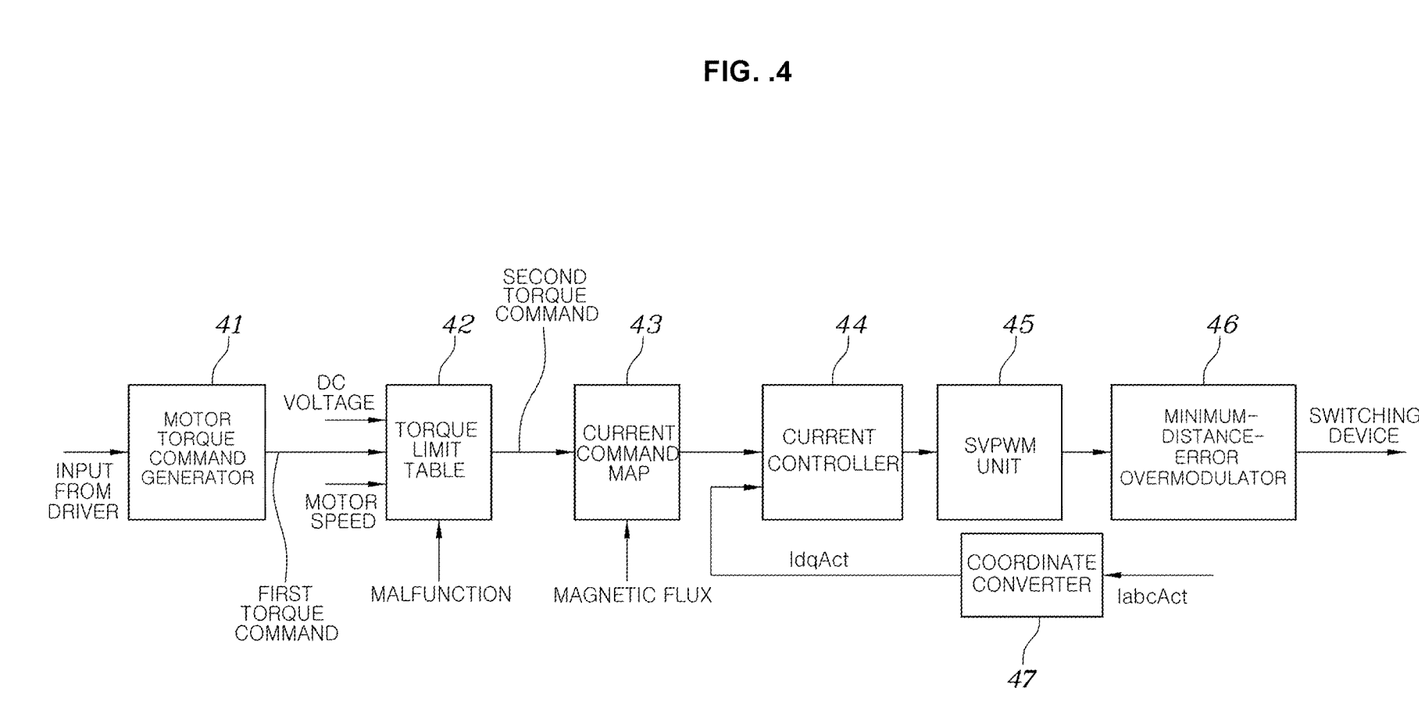
FIG. 4 is a block diagram showing in detail a controller applied to the motor driving apparatus according to an exemplary embodiment of the present disclosure.

FIG. 4 is a block diagram showing in detail a controller applied to the motor driving apparatus according to an exemplary embodiment of the present disclosure.

Referring to FIG. 4, the controller 40 applied to the motor driving apparatus according to an exemplary embodiment of the present disclosure may include: a motor torque command generator 41 that generates a first torque command for each of the motors 10 and 20 based on input from a driver, for example, the depression amount of an accelerator pedal; a torque limit table 42 that generates a second torque command, which is obtained by applying a preset torque command limit to the first torque command, based on DC voltage applied to the inverters 100~300 and the speeds of the motors 10 and 20; a current command map 43 that generates a current command IdgRef for the motors 10 and 20 based on the second torque command the magnetic fluxes of the motors 10 and 20; a current controller 44 that generates voltage command VdqRef based on the result of comparing the current command IdgRef with motor current IdqAct which is actually input to the motors 10 and 20; a space vector modulator 45 that generates a pulse width modulation signal corresponding to the voltage command VdqRef by applying a space vector pulse width modulation (SVPWM) technique; and a minimum-distance-error overmodulator 46 that generates a control signal for controlling the switching devices S11~S16, S21~S26, and S31~S36 included in the inverters 100~300 by applying a minimum-distance-error overmodulation method to the pulse width modulation signal generated by the space vector modulator 45. In FIG. 4, reference numeral '47' indicates a coordinate converter that converts motor input 3-phase current IabcAct detected by a current detector, etc. into a dq signal which may be compared by the current controller 44.

When the motor driving apparatus is actually applied to a vehicle, the controller 40 may be implemented as one or more parts. For example, in a specific vehicle, the motor torque command generator 41 may be implemented in a vehicle control unit (VCU) type and the other components may be implemented in a motor control unit (MCU) type. The controller 40, regardless of the number or shape of physical parts, may be understood as a components including one or more processor programmed with an algorithm for performing operation for implementing various embodiments of the present disclosure and one or more memories keeping an algorithm and keeping information generated while the algorithm is executed or preset data for executing the algorithm.

Figure 5:
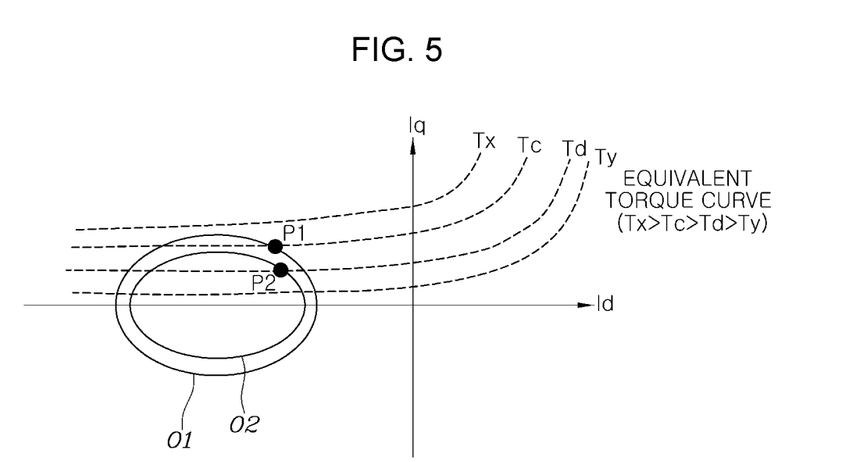
FIG. 5 is a view exemplarily illustrating a torque command limit technique by the controller applied to the motor driving apparatus according to an exemplary embodiment of the present disclosure.
Figure 6:
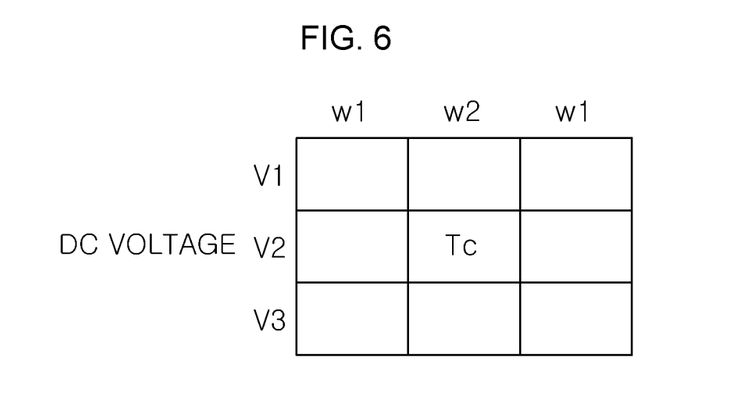
FIG. 6 and FIG. 7 are views briefly showing an example of a torque command limit table which is used by the controller applied to the motor driving apparatus according to an exemplary embodiment of the present disclosure.
Figure 7:
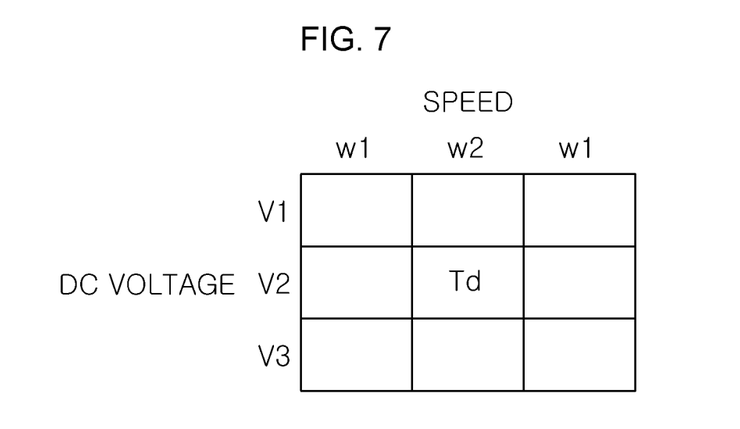

FIG. 5 is a view exemplarily illustrating a torque command limit technique by the controller applied to the motor driving apparatus according to an exemplary embodiment of the present disclosure. FIG. 6 and FIG. 7 are views briefly showing an example of a torque command limit table which is used by the controller applied to the motor driving apparatus according to an exemplary embodiment of the present disclosure.

Referring to FIG. 5, it has been known that the maximum magnitude of motor torque which may be linearly controlled may be determined by voltage limit ellipses O1 and O2 that are determined by the rotation speed of the motor and the maximum magnitude of phase voltage which may be provided by an inverter that provides 3-phase power to the motor. The larger the speed and the larger the magnitude of the maximum phase voltage of the inverter, the smaller the magnitude of the voltage limit ellipses O1 and O2. When a motor current is determined inside the voltage limit ellipses O1 and O2, the motor may be stably linearly controlled.

When a motor is driven using two inverters connected to both sides of a motor coil in an open end winding connection structure under the condition that a motor is driven at a uniform speed, the maximum value of the phase voltage which may be provided to the motor increases. Accordingly, the size of the voltage limit ellipse O1 is greater than the voltage limit ellipse O2 which is formed when a motor including a Y-connection structure is driven by one inverter. As a voltage limit ellipse is large, a current command may be generated at a point P1 intersecting a larger-value equivalent torque curve. The maximum value of the phase voltage may be determined by the DC voltage which is applied to the inverter.

The torque limit table 42 in the controller 40 is a table keeping a torque limit value hat is determined based on the rotation speed of the motor and the magnitude of DC voltage which is applied to the inverter.

The torque limit table 42 may include a torque limit table which is used when the first motor 10 is driven in the open end winding type (see FIG. 6) and a torque limit table which is used when the first motor 10 is driven in the Y-connection type (see FIG. 7).

As shown in FIG. 6 and FIG. 7, the torque limit table which is used when the first motor 10 is driven in the open end winding type can have a large torque limit value in comparison to when the first motor 10 is driven in the Y-connection type at the same motor rotation speed.

Obviously, the torque limit table 42 may also include a torque limit table which is applied to control the second motor 20 which is driven in the Y-connection type by the third inverter 300.

While the controller 40 drives the first motor 10 in the open end winding type by controlling two inverters 100 and 200, when one inverter cannot be controlled due to a problem with the converter, the controller, to compensate for the present problem, determines whether additional torque may be generated through the second motor 20, and controls the second motor 20 to generate additional torque when additional torque may be generated, facilitating a driver to drive the vehicle with desired torque.

To the present end, the controller 40 can newly generate an appropriate second torque command for each motor when an inverter breaks.

The current command map 43, current controller 44, space vector pulse width modulator 46, minimum-distance-error overmodulator 47, and coordinate converter 47 shown in FIG. 4 are common components that are operated by technologies known in the art, so they are not further described.

Hereafter, a method for controlling a motor according to various embodiments of the present disclosure which is performed by the controller 40 is described. The operation of the controller 40 and corresponding operation effects may be further clearly understood through the following description of the method for controlling a motor according to various embodiments of the present disclosure.

Figure 8:
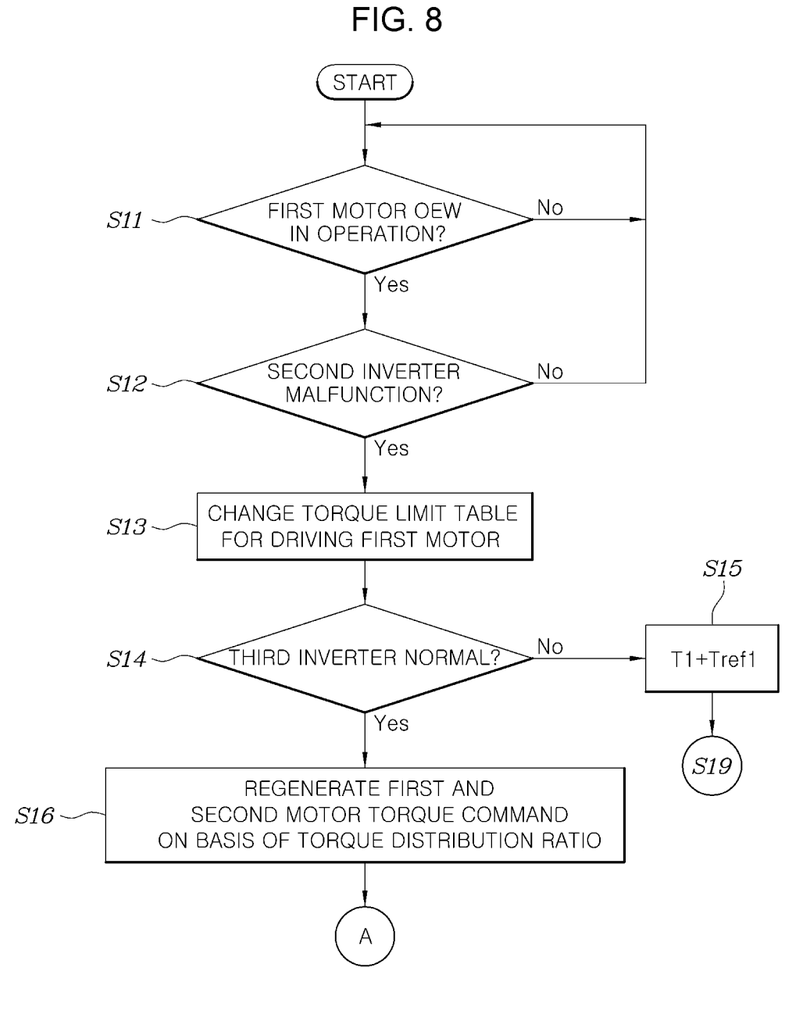
FIG. 8 and FIG. 9 are flowcharts showing a method for driving a motor according to an exemplary embodiment of the present disclosure.
Figure 9:
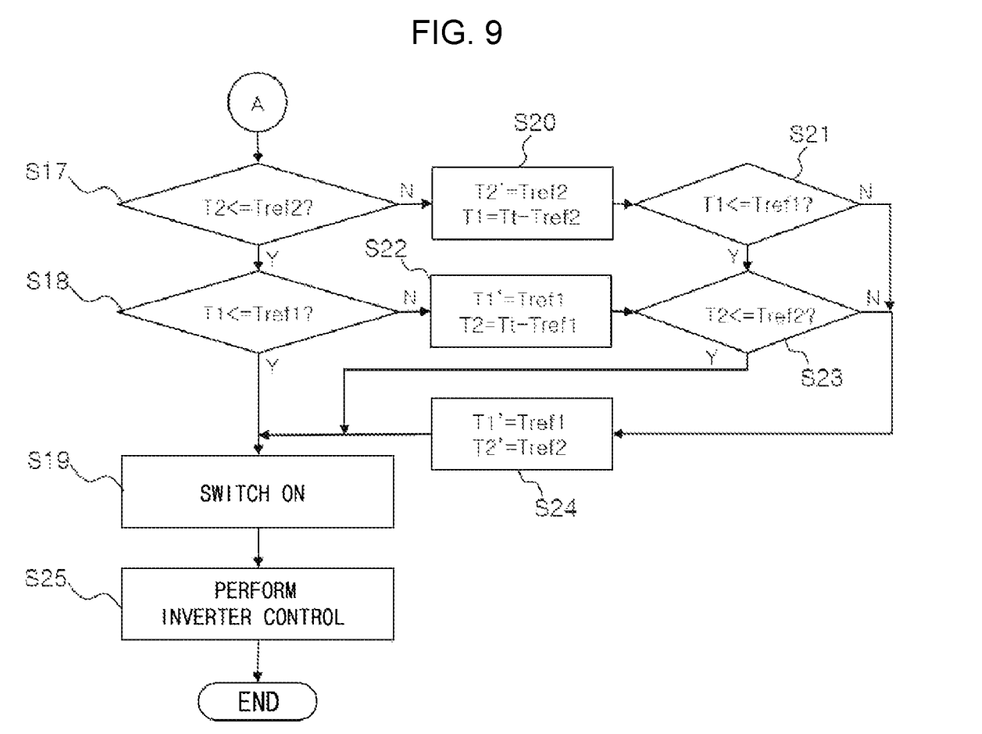

FIG. 8 and FIG. 9 are flowcharts showing a method for driving a motor according to an exemplary embodiment of the present disclosure.

Referring to FIG. 8 and FIG. 9, a method of controlling a motor according to an exemplary embodiment of the present disclosure may start with a process of recognizing malfunction of the second inverter (S12) while the controller 40 operates the first motor 10 by switching the first inverter 100 and the second inverter 200 using an open end winding connection structure (S11).

In step S12, the controller 40 can recognize malfunction of the second inverter 200 through various malfunction determination technique known in the art such as performing a diagnosis process set to be periodically performed or recognizing an abnormal value in information received from various detectors.

When the controller 40 recognizes malfunction, the torque limit table 42 can change the torque limit table which is applied to drive the first motor 10 from a table for open end winding driving (corresponding to FIG. 6) into a table for Y-connection driving (corresponding to FIG. 7). That is, the controller 40 can change the torque limit table so that a torque limit table in which a smaller torque limit value is set is applied. Accordingly, the value of torque generated by the first motor 10 decreases.

Next, the controller 40, to compensate for the reduction of torque of the first motor 20 by driving the second motor 20, can diagnose whether the third inverter 300 for driving the second motor 20 is operated normally (S14), and can determine a second torque command of the first motor 10 as a torque limit value Tref1 which is used to drive the first motor in the Y-connection structure when the third converter 300 is not operated normally (S15).

When the controller 40 determines that the third inverter 300 is operated normally in step S14, it is possible to generate a first torque command for the first motor 10 and the second motor 20 by distributing the preset entire required torque based on input from a driver based on a preset torque distribution ratio (S16).

The torque distribution ratio is the ratio of torque which is distributed to the front wheels and the rear wheels of a 4-wheel drive vehicle and may be determined in advance using a well-known technology of determining a distribution ratio based on the positions of the driving wheels to which the first motor 10 and the second motor 20 are applied, the speed of the vehicle, the acceleration of the vehicle, the weight of the vehicle, the state of the road surface, etc.

Next, the controller 40 can check whether the first torque command T2 of the second motor 20 reset in step S16 is smaller than or a same as the torque limit value Tref2 of the second motor in the torque limit table 42 (S17). Furthermore, when the first torque command T2 of the second motor 20 is smaller than or a same as the torque limit value Tref2 of the second motor 20, the controller 40 can check whether the first torque command T1 of the first motor 10 reset in step S16 is smaller than or a same as the torque limit value Tref1 for Y-connection driving of the first motor 10 in the torque limit table 42 (S18).

When the reset first torque command T1 of the first motor 10 is smaller than or a same as the torque limit value Tref1 for Y-connection driving of the first motor 10 in the torque limit table 42 in step S18, the first torque commands reset in step S16 are all smaller than a limit value, so that the controller 40 turns on all of the switches S41~S43 (S19) and sets the first torque command as the second torque command controls the first inverter 100 and the third inverter 300, being able to drive the first motor 10 and the second motor 20.

When the first torque command T2 of the second motor 20 is greater than the torque limit value Tref2 of the second motor 20 in step S17, the controller 40 can determine a second torque command T2' of the second motor 20 as the limit value Tref2 and can reset a value obtained by subtracting the limit value Tref2 from a total required torque Tt by a driver as the first torque command of the first motor 10 (S20).

Next, the controller 40 determines whether the first torque command T1 of the first motor 10 reset in step S20 is smaller than or a same as the torque limit value Tref1 for Y-connection driving of the first motor 10 in the torque limit table 42, and can determine the first torque command of the first motor 10 reset in step S20 as the second torque command (S21) when the reset first torque command T1 of the first motor 10 is smaller than or a same as the torque limit value Tref1 for Y-connection driving of the first motor 10 in the torque limit table 42.

Next, the controller 40 can turn on all of the switches S41~S43 (S19), drive the first inverter 100 in the Y-connection type to output the second torque command of the first motor 10, that is, the value obtained by subtracting the torque limit value of the second motor 20 from the total required torque required by the driver, and control the third inverter 300 so that the second motor 20 outputs the torque limit value of the second motor 20 (S25).

When the first torque command T1 of the first motor 10 is greater than the torque limit value Tref1 of the second motor 20 which is applied when the first motor 20 is driven in the Y-connection type in step S18, the controller 40 can determine a second torque command T1' of the first motor 10 as the torque limit value Tref1 and can reset a value obtained by subtracting the torque limit value Tref1 from a total required torque Tt by a driver as the first torque command of the second motor 20 (S22).

Next, the controller 40 determines whether the first torque command T2 of the second motor 20 reset in step S22 is smaller than or a same as the torque limit value Tref2 of the second motor 20 in the torque limit table 42, and can determine the first torque command of the second motor 20 reset in step S22 as the second torque command (S23) when the reset first torque command T2 of the second motor 20 is smaller than or a same as the torque limit value Tref2 of the second motor 20 in the torque limit table 42.

Next, the controller 40 can turn on all of the switches S41~S43 (S19), control the first inverter 100 in the Y-connection type to output the torque limit value Tref1 when the first motor 10 is driven in the Y-connection type, control the third inverter 300 so that the second motor 20 outputs the value obtained by subtracting the torque limit value Tref1 when the first motor 10 is driven in the Y-connection type from the torque required torque required by the driver (S25).

When it is determined that the reset first torque T1 of the first motor 10 is greater than the torque limit value Tref1 for driving the first motor 10 in the Y-connection type in the torque limit table in step S21 and when it is determined that the reset first torque command T2 of the second motor 20 is greater than the torque limit value Tref2 of the second motor 20 in the torque limit table 42 in step S23, the controller 40 can determine the second torque commands T1' and T2' of the first motor 10 and the second motor 20 as the limit values Tref1 and Tref2 determined in respective torque limit tables 42 (S24).

Next, the controller 40 can turn on all of the switches S41~S43 (S19), control the first inverter 100 in the Y-connection type to output the torque limit value Tref1 when the first motor 10 is driven in the Y-connection type, control the third inverter 300 so that the second motor 20 outputs the torque limit value Tref2 (S25).

As described above, according to the motor driving apparatus according to various embodiments of the present disclosure and the method for driving the apparatus, when an open end winding driving type of controlling two inverters connected to both ends of a motor coil, respectively, is applied to one of motors connected to provide a driving force to a plurality of driving wheels, even when one of the two inverters breaks and the output of the corresponding motor decreases, it is possible to compensate for the reduction of output due to the malfunction of the inverter by additionally driving a motor applied to other driving wheels. Accordingly, a driver can keep stably driving while accelerating the vehicle to a desired speed.

Furthermore, the term related to a control device such as "controller", "control apparatus", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving apparatus including a first motor providing power to a first driving wheel of a vehicle and including a plurality of coils corresponding to a plurality of phases, respectively, and a second motor providing power to a second driving wheel of the vehicle and including a plurality of coils corresponding to a plurality of phases, respectively and including first ends connected to each other, the motor driving apparatus comprising: a first inverter connected to first ends of the coils of the first motor and including a plurality of first switching devices; a second inverter connected to second ends of the coils of the first motor and including a plurality of second switching devices; a third inverter connected to second ends of the coils of the second motor and including a plurality of third switching devices; and a controller configured to drive the second motor by performing pulse width control on the third switching devices when a problem occurs in the second inverter while driving the first motor in an open end winding mode in which pulse width modulation control is performed on the first switching devices and the second switching devices, wherein when the problem occurs in the second inverter in the open end winding mode, the controller is configured to connect the second ends of the coils of the first motor to each other and to drive the first motor in a Y-connection mode in which pulse width modulation control is performed on the first switching devices.

2. The motor driving apparatus of claim 1, further including: a plurality of switches of which first ends are connected to the second ends of the coils of the first motor, respectively, and of which second ends are connected to each other, wherein when the problem occurs in the second inverter in the open-end winding mode, the controller is configured to turn on the switches and to drive the first motor in the Y-connection mode.

3. The motor driving apparatus of claim 1, wherein when the problem occurs in the second inverter while the controller drives the first motor in the open-end winding mode, the controller is configured to divide and determine a preset entire required torque into a torque command of the first motor and a torque command of the second motor.

4. The motor driving apparatus of claim 3, wherein when the problem occurs in the second inverter while the controller drives the first motor in the open end winding mode, the controller is configured to distribute and determine the preset entire required torque into the torque command of the first motor and the torque command of the second motor in accordance with a preset distribution ratio.

5. The motor driving apparatus of claim 3, wherein the controller includes a torque limit table keeping a first torque limit value which is applied to the first motor in the open end winding mode, a second torque limit value which is applied to the first motor in the Y-connection mode, and a third torque limit value which is applied to the second motor when the second motor is driven by performing pulse width modulation control on the third switching devices.

6. The motor driving apparatus of claim 3, wherein when the problem occurs in the second inverter while the controller drives the first motor in the open end winding mode, the controller is configured to control the first motor to output the second torque limit value and to control the second motor to output the third torque limit value when the torque command of the second motor divided and determined from the preset entire required torque is smaller than or a same as the third torque limit value and the torque command of the first motor divided and determined from the preset entire required torque is smaller than or a same as the second torque limit value.

7. The motor driving apparatus of claim 3, wherein when the problem occurs in the second inverter while the controller drives the first motor in the open end winding mode, the controller is configured to change the torque command of the second motor into the third torque limit value and to determine the torque command of the first motor as a value obtained by subtracting the third torque limit value from the preset entire required torque when the torque command of the second motor divided and determined from the preset entire required torque is greater than the third torque limit value.

8. The motor driving apparatus of claim 7, wherein
when the torque command of the first motor determined as the value obtained by subtracting the third torque limit value from the preset entire required torque is smaller than or a same as the second torque limit value, the controller is configured to control the first motor to output the value obtained by subtracting the third torque limit value from the preset entire required torque; and
when the torque command of the first motor determined as the value obtained by subtracting the third torque limit value from the preset entire required torque is greater than the second torque limit value, the controller is configured to control the first motor to output the second torque limit value.

9. The motor driving apparatus of claim 3, wherein when the problem occurs in the second inverter when the controller drives the first motor in the open end winding mode, the controller is configured to change the torque command of the first motor into the second torque limit value and to determine the torque command of the second motor as a value obtained by subtracting the second torque limit value from the preset entire required torque when the torque command of the second motor divided and determined from the preset entire required torque is smaller than or a same as the third torque limit value and the torque command of the first motor divided and determined from the preset entire required torque is greater than the second torque limit value.

10. The motor driving apparatus of claim 9, wherein
when the torque command of the second motor determined as the value obtained by subtracting the second torque limit value from the preset entire required torque is smaller than or a same as the third torque limit value, the controller is configured to control the second motor to output the value obtained by subtracting the second torque limit value from the preset entire required torque; and
when the torque command of the second motor determined as the value obtained by subtracting the second torque limit value from the preset entire required torque is greater than the third torque limit value, the controller is configured to control the second motor to output the third torque limit value.

11. A method of driving a motor which controls the motor driving apparatus of claim 1, the method comprising:
recognizing, by the controller, that the problem has occurred in the second inverter while driving the first motor in the open end winding mode in which the pulse width modulation control is performed on the first switching devices and the second switch devices;
dividing and determining, by the controller, a preset entire required torque into a torque command of the first motor and a torque command of the second motor; and
correcting, by the controller, the torque command of the first motor and the second motor divided and determined from the preset entire required torque in accordance with a result of comparing the torque command of the first motor and the torque command of the second motor with a plurality of preset torque limit values, to obtain corrected values, and driving the first motor and the second motor according to the corrected values.

12. The method of claim 11, wherein the driving connects the second ends of the coils of the first motor to each other and drives the first motor in a Y-connection mode in which pulse width modulation control is performed on the first switching devices.

13. The method of claim 12,
wherein the motor driving apparatus further includes a plurality of switches of which first ends are connected to the second ends of the coils of the first motor, respectively, and of which second ends are connected to each other, and
wherein the driving turns on the switches and drives the first motor in the Y-connection mode by the controller when the problem occurs in the second inverter in the open end winding mode.

14. The method of claim 11, wherein the determining distributes and determines the preset entire required torque into the torque command of the first motor and the torque command of the second motor in accordance with a preset distribution ratio.

15. The method of claim 12, wherein the controller includes a torque limit table keeping a first torque limit value which is applied to the first motor in the open end winding mode, a second torque limit value which is applied to the first motor in the Y-connection mode, and a third torque limit value which is applied to the second motor when the second motor is driven by performing pulse width modulation control on the third switching device.

16. The method of claim 15, wherein the driving controls the first motor to output the second torque limit value and controls the second motor to output the third torque limit value by the controller when the torque command of the second motor divided and determined from the preset entire required torque is smaller than or a same as the third torque limit value and the torque command of the first motor divided and determined from the preset entire required torque is smaller than or a same as the second torque limit value.

17. The method of claim 15, the driving changes the torque command of the second motor into the third torque limit value and determines the torque command of the first motor as a value obtained by subtracting the third torque limit value from the preset entire required torque by the controller when the torque command of the second motor divided and determined from the preset entire required torque is greater than the third torque limit value.

18. The method of claim 17, wherein
when the torque command of the first motor determined as the value obtained by subtracting the third torque limit value from the preset entire required torque is smaller than or a same as the second torque limit value, the driving controls the first motor to output the value obtained by subtracting the third torque limit value from the preset entire required torque by the controller; and
when the torque command of the first motor determined as the value obtained by subtracting the third torque limit value from the preset entire required torque is greater than the second torque limit value, the driving controls the first motor to output the second torque limit value by the controller.

19. The method of claim 15, wherein the driving changes the torque command of the first motor into the second torque limit value and determines the torque command of the second motor as a value obtained by subtracting the second torque limit value from the preset entire required torque by the controller when the torque command of the second motor divided and determined from the preset entire required torque is smaller than or a same as the third torque limit value and the torque command of the first motor divided and determined from the preset entire required torque is greater than the second torque limit value.

* * * * *